US012078620B2

(12) United States Patent
Nogami et al.

(10) Patent No.: US 12,078,620 B2
(45) Date of Patent: Sep. 3, 2024

(54) ANALYSIS APPARATUS

(71) Applicant: Hitachi High-Tech Corporation, Tokyo (JP)

(72) Inventors: Makoto Nogami, Tokyo (JP); Daisuke Akieda, Tokyo (JP); Shinya Matsuoka, Tokyo (JP); Shinya Ito, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 609 days.

(21) Appl. No.: 17/432,538

(22) PCT Filed: Feb. 25, 2020

(86) PCT No.: PCT/JP2020/007532
§ 371 (c)(1),
(2) Date: Aug. 20, 2021

(87) PCT Pub. No.: WO2020/171240
PCT Pub. Date: Aug. 27, 2020

(65) Prior Publication Data
US 2022/0107293 A1 Apr. 7, 2022

(30) Foreign Application Priority Data
Feb. 22, 2019 (JP) .................................. 2019-030316

(51) Int. Cl.
*G01N 30/46* (2006.01)
*G01N 30/30* (2006.01)
*G01N 30/38* (2006.01)

(52) U.S. Cl.
CPC ............. *G01N 30/46* (2013.01); *G01N 30/30* (2013.01); *G01N 2030/385* (2013.01)

(58) Field of Classification Search
CPC .. G01N 30/46; G01N 30/30; G01N 2030/385; G01N 30/26; G01N 30/86; G01N 30/32; G01N 30/34
See application file for complete search history.

(56) References Cited

U.S. PATENT DOCUMENTS 5,156,039 A 10/1992 Giddings
6,911,151 B1 6/2005 Müler-Kuhrt et al.
(Continued)

FOREIGN PATENT DOCUMENTS

JP 2002-530674 A 9/2002
WO WO 2017/122261 A1 7/2017

OTHER PUBLICATIONS

International Preliminary Report on Patentability (PCT/IB/338 & PCT/IB/373) issued in PCT Application No. PCT/JP2020/007532 dated Sep. 2, 2021, including English translation of document C2 (Japanese-language Written Opinion (PCT/ISA/237) filed on Aug. 20, 2021 (six (6) pages).

(Continued)

*Primary Examiner* — Terry K Cecil
(74) *Attorney, Agent, or Firm* — Crowell & Moring LLP

(57) ABSTRACT

An analysis apparatus capable of adjusting holding time of each stream in a plurality of HPLC streams without adjusting a pipe length, and capable of determining degradation of a separation column, a liquid-delivery failure, or the like without removing a pipe from the apparatus is implemented. Air is suctioned from the shipper 109 and injected into the verification flow paths 122 and 123, and holding time when a baseline of the detector 125 changes is stored in the control unit 130. The air in the verification flow paths 122 and 123 of the stream 101 and the stream 102 is measured, and holding time of the stream 101 and holding time of the stream 102 are compared to determine whether or not there is a difference of 1 second or more in the holding time. When (Continued)

the difference in holding time is 1 second or more, correction is performed. Holding time information of the same verification flow paths 122 and 123 in the stream 101 and the stream 102 are compared with holding time information stored in the control unit 130 and correction is performed when the difference in holding time is 1 second or more.

8 Claims, 14 Drawing Sheets

(56) References Cited

U.S. PATENT DOCUMENTS

| | | |
|---|---|---|
| 7,178,386 B1 | 2/2007 | Gamble et al. |
| 11,860,142 B2 * | 1/2024 | Sugiyama .......... G01N 30/8658 |
| 2009/0145851 A1 | 6/2009 | Witt |
| 2010/0216180 A1 | 8/2010 | Mirzaei et al. |
| 2018/0292368 A1 | 10/2018 | Franz et al. |
| 2022/0011280 A1 * | 1/2022 | Ogata ................ G01N 30/7233 |

OTHER PUBLICATIONS

Extended European Search Report issued in European Application No. 20759119.9 dated Oct. 14, 2022 (seven (7) pages).

International Search Report (PCT/ISA/210) issued in PCT Application No. PCT/JP2020/007532 dated Jun. 2, 2020 with English translation (four (4) pages).

Japanese-language Written Opinion (PCT/ISA/237) issued in PCT Application No. PCT/JP2020/007532 dated Jun. 2, 2020 (four (4) pages).

Agilent Technologies Inc., "The Agilent StreamSelect LC/MS Solution: Increasing the Throughput of a Triple Quadrupole Mass Spectrometer", URL:https /www.agilent.com/cs/library/technicaloverviews/public/5991-3274EN.pdf (eight (8) pages), 2013.

* cited by examiner

[FIG. 1]
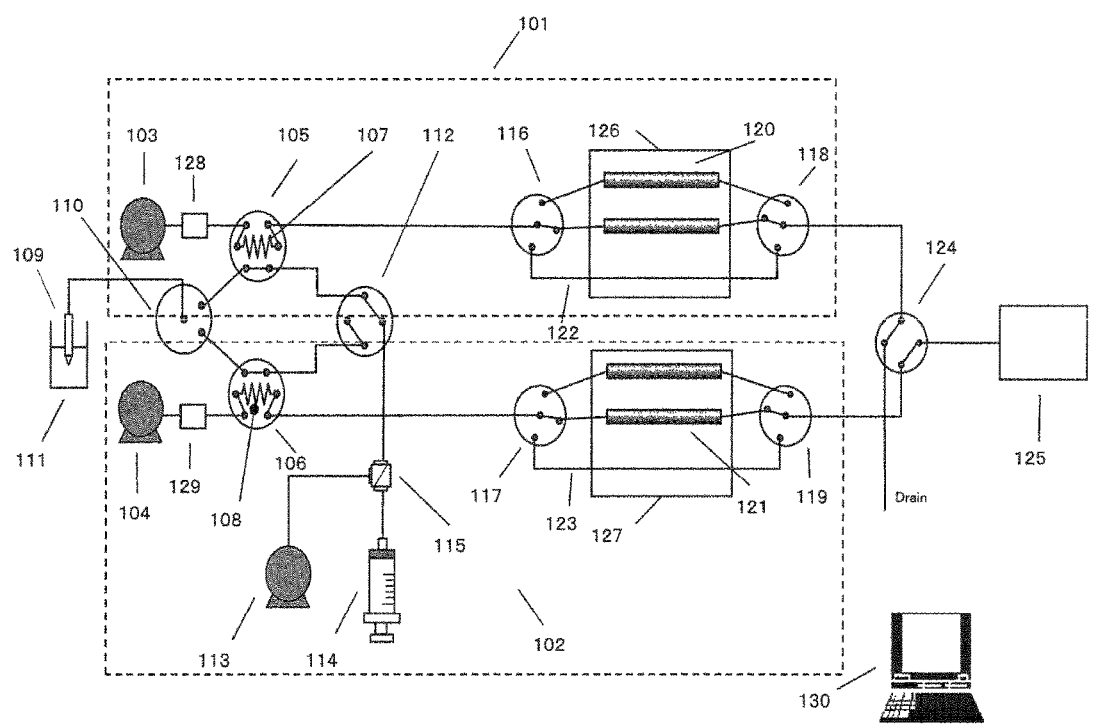

[FIG. 2]
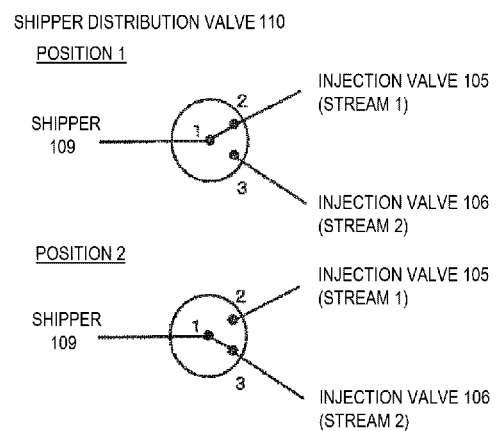

[FIG. 3]
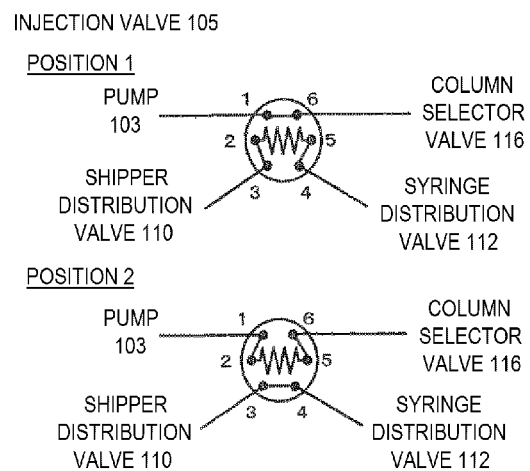

[FIG. 4]
SYRINGE DISTRIBUTION VALVE 112
POSITION 1
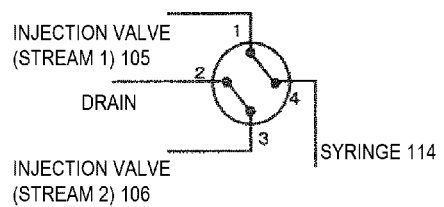
POSITION 2
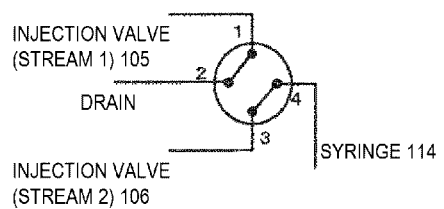

[FIG. 5]
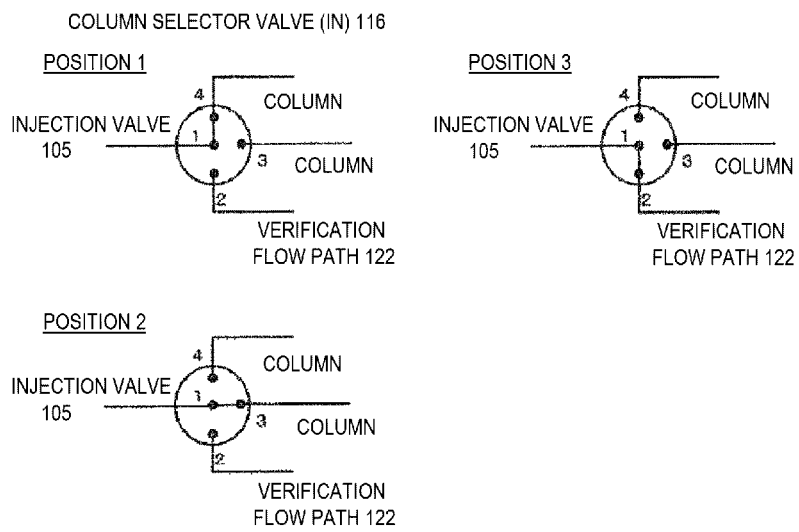

[FIG. 6]
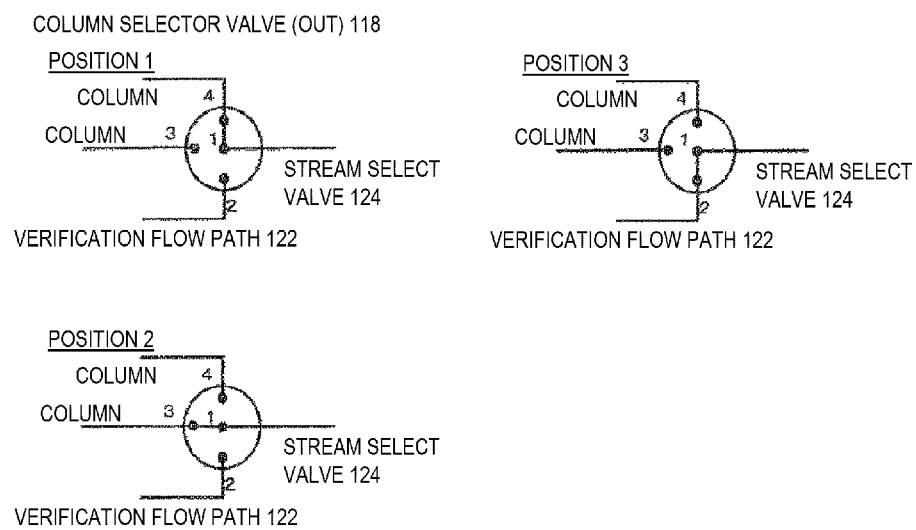

[FIG. 7]
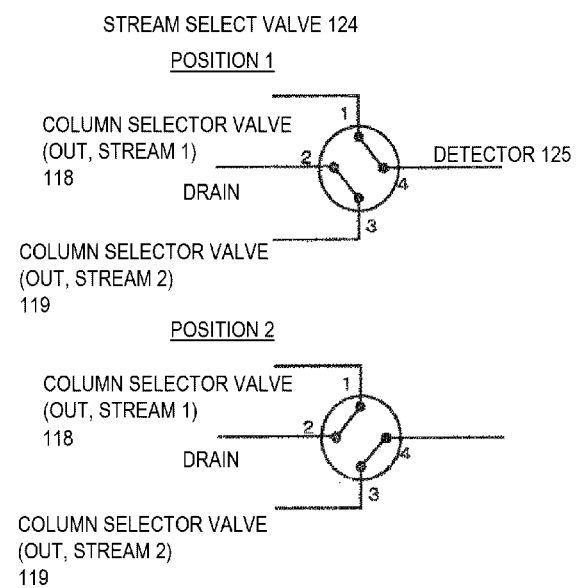

[FIG. 8]
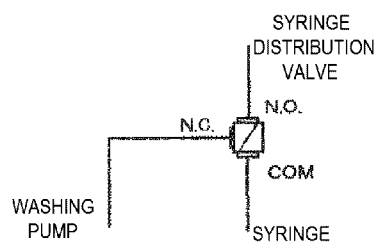

[FIG. 9]
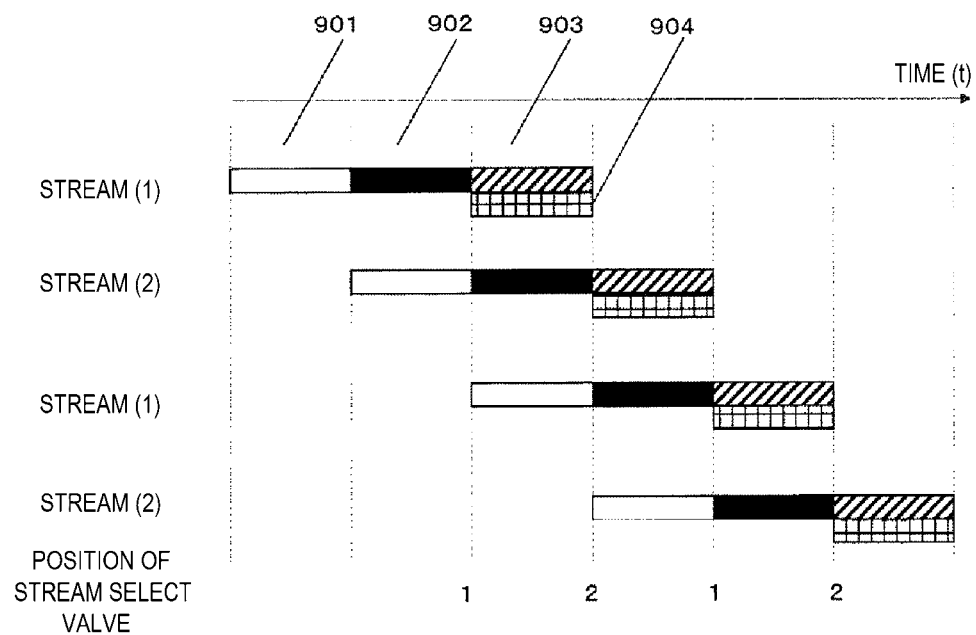

[FIG. 10]
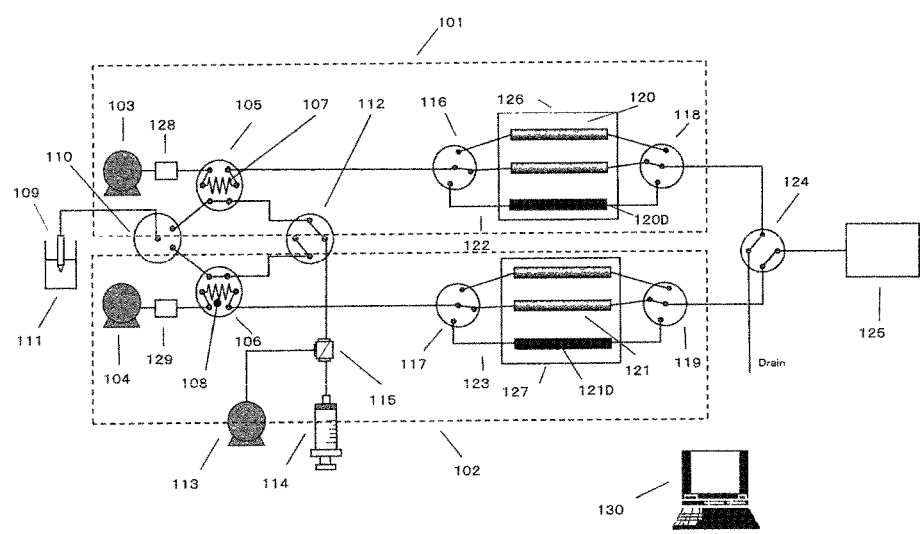

[FIG. 11]
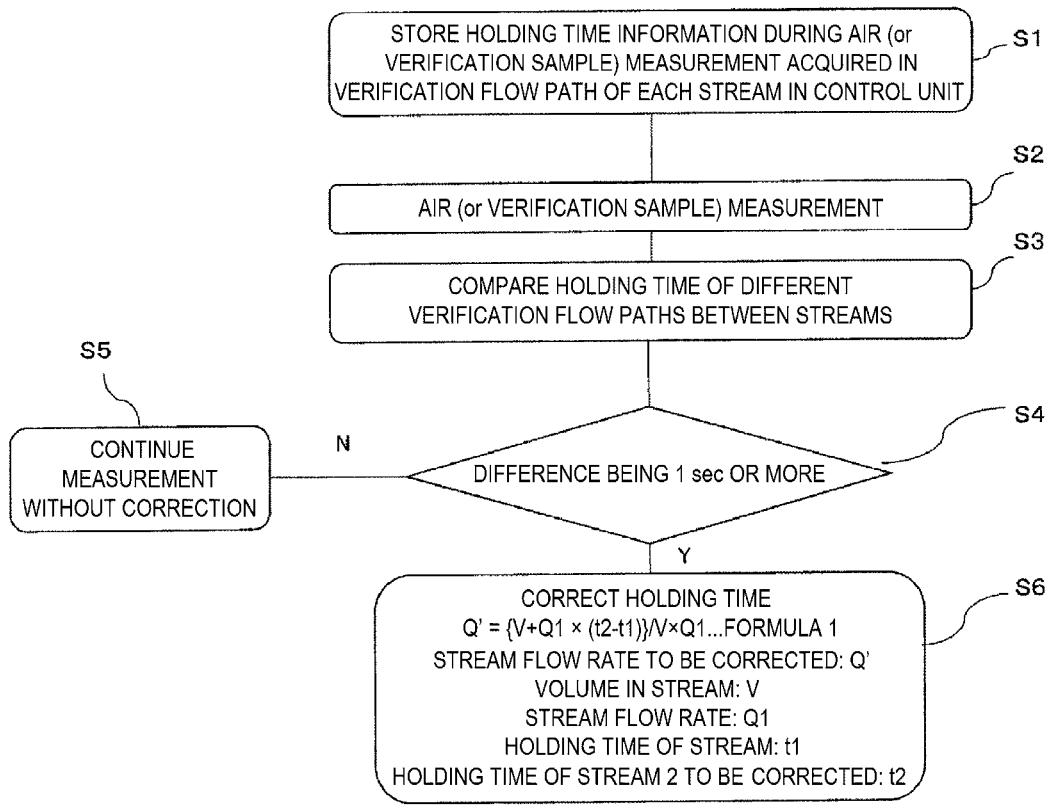

[FIG. 12]
1101: CHROMATOGRAM OF STREAM 1         HOLDING TIME: 85.61 sec
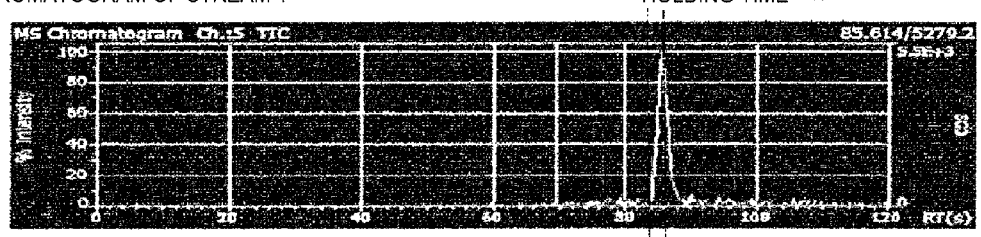
1102: CHROMATOGRAM OF STREAM 2         HOLDING TIME: 84.01 sec
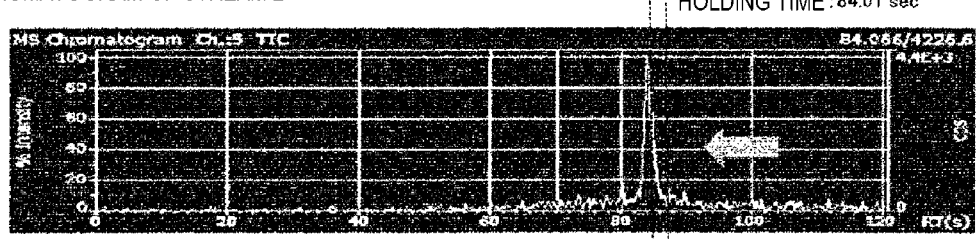
1103: CORRECTED CHROMATOGRAM           HOLDING TIME: 85.36 sec
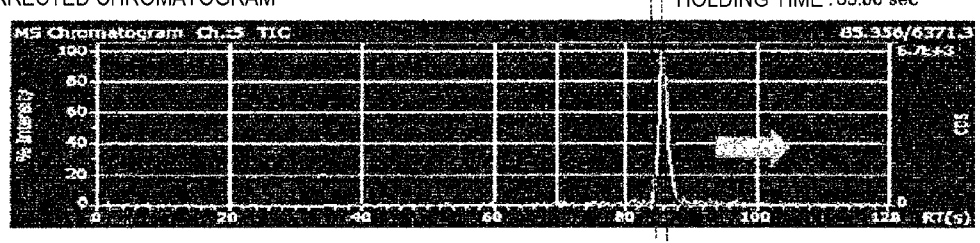

[FIG. 13]
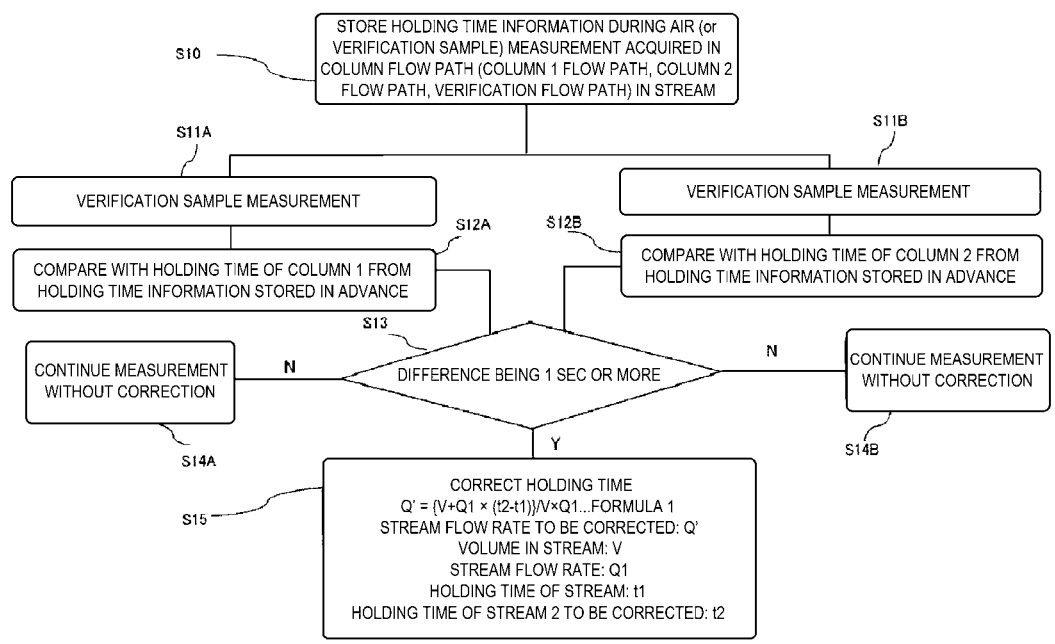

[FIG. 14]
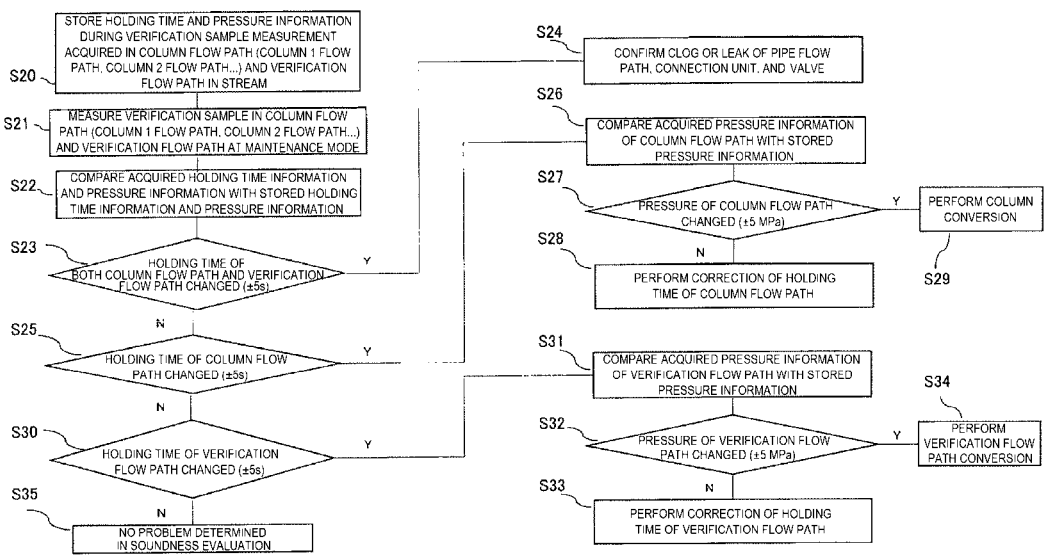

ANALYSIS APPARATUS

TECHNICAL FIELD

The present invention relates to an analysis apparatus that analyzes a sample.

BACKGROUND ART

One analysis method using a separation column is chromatography.

The separation column is obtained by filling a thin cylindrical container at a high pressure with a filler of particles that bind various functional groups to a base material such as silica gel or polymer gel. The chromatography is a method of distributing various materials at a certain ratio due to a difference in affinity (interaction) between a stationary phase and a mobile phase that carries the materials through the stationary phase and separating the materials using a difference in ratio between the materials.

In high performance liquid chromatography (HPLC), liquid is used as the mobile phase. The high performance liquid chromatography (HPLC) is composed of the separation column as well as a liquid delivery pump that delivers the mobile phase, an injector that introduces a sample, a detector that detects a target component in the sample, a pipe that connects the components, and a control device that controls an apparatus operation.

The liquid delivery pump performs gradient liquid delivery of holding and delivering a plurality of mobile phases to the separation column while changing a mixing ratio per hour. In the gradient liquid delivery, first, the liquid delivery pump delivers a mobile phase having a composition of low sample elution capability to the separation column. Therefore, the target component in the sample injected into the separation column is adsorbed on the separation column.

Next, the target component in the sample that is delivered while being changed into a composition of high elution capability and is adsorbed on the separation column, is eluted from the separation column and reaches the detector.

The liquid delivery pump changes the mobile phase into a composition into high elution capability in order to wash contaminants remaining in the separation column after the target component is detected.

This way, in the gradient separation, the mobile phase composition in the separation column changed per analysis. When continuous analysis is performed in the gradient liquid delivery, it is necessary to change the composition of the mobile phase in the separation column into an initial mobile phase in order to start the next analysis after completion of each analysis.

In addition, in order to avoid contamination by contaminants, it is necessary to perform preparations such as washing of the injector or returning of an injector valve to an initial position.

An apparatus is known in which a plurality of HPLC streams are coupled to one detector through a stream select valve that switches between the HPLC streams such that analysis of the HPLC streams can be performed.

The HPLC stream is defined as an HPLC flow path including a liquid delivery pump, an injector, a separation column, a column oven that controls the temperature of the separation column, and a pipe that connects the liquid delivery pump, the injector, and the separation column to each other. The HPLC streams have the same configuration and are arranged in parallel.

By adjusting time of a separation column equilibration step, an elution step, a washing step, and an injector washing step, the target component is introduced constantly from each of the HPLC streams to the detector such that there is no waiting time in the detector.

The apparatus having the above-described configuration is advantageous not only in that the analysis time can be optimized but also in that contamination of the detector can be reduced by connecting the HPLC streams to the detector only for a period of time when a peak appears to prevent contaminants in the sample that pass through the separation column at the start of analysis or contaminants remaining in the separation column during the washing step from being introduced into the detector.

A known example of the apparatus including a plurality of HPLC streams is disclosed in, for example, Agilent Technologies Inc., "The Agilent StreamSelect LC/MS Solution: Increasing the Throughput of a Triple Quadrupole Mass Spectrometer", URL:https://www.agilent.com/cs/library/technicaloverviews/public/5991-3274EN.pdf (NPL 1). NPL 1 discloses an analysis apparatus including two HPLC streams having the same configuration, a valve that switches between the HPLC streams, and one detector.

Each of the HPLC streams includes a sample injection unit, a pump, a trap column, a column, a column switching valve that switches between flow paths of the trap column and the column, and a liquid delivery flow path. In each of the HPLC streams, a sample component introduced from the sample injection unit is temporarily trapped by the trap column, contaminants other than the sample component are disposed, the column switching valve is switched, and subsequently, the sample component trapped by the trap column is introduced into the separation column by the pump. After the separation into the separation column, the sample component is introduced into one detector.

While the measurement is performed in one HPLC stream, washing of the sample injection unit and the liquid delivery flow path or preparation for the next sample injection is performed in another HPLC stream.

In addition, WO-A-2017/122261 (PTL 1) discloses a high performance liquid chromatography including: a) a plurality of analysis flow paths including a trapping unit that traps a target component in a sample and a separation unit that separates the target component in terms of time; b) one detection unit that is connected in common to the plurality of analysis flow paths to detect a target component separated by each of the separation units; c) one sample injection flow path that supplies a carrier; d) a sample injection unit that injects a sample into the sample injection flow path; and e) an analysis flow path switching unit that selectively connects the sample injection flow path provided downstream of the sample injection unit to anyone of the plurality of analysis flow paths. In the technique described in PTL 1, by providing the mechanism for allowing the sample injection unit including one sample injection flow path to introduce a sample into a plurality of HPLC streams, the sample injection mechanism and the operation are not complicated, and even in a case where the number of HPLC streams increases, the processing time or processing speed of the entire apparatus can be regulated.

In order to optimize a switching timing of the stream select valve that switches between the HPLC streams to optimize the analysis time, it is desirable that the target component is known.

When an analysis apparatus including a plurality of HPLC streams is used in a pharmacokinetic study or a clinical test where a target component is known, analysis conditions including a separation column, an eluent, or gradient conditions are determined in advance, and the analysis conditions are stored in a control device. By inputting a target component and the number of samples through an operation screen of the control device during analysis, the analysis conditions stored in the control device are loaded to start the analysis.

Since the time of the target component where a peak appears is known, the switching timing of the stream select valve is adjusted, and the detector and an HPLC stream where the target component is separated are connected to each other for a period of time obtained by adding the likelihood time to the switching time. The period of time where the peak of the target component is detected by the detector, that is, the period of time where the HPLC stream and the detector are connected will be referred to as a detection window time. During the detection window time of one HPLC stream, anyone of the separation column equilibration step, the washing step, the injector washing step, and the preparation step is performed at the same time in another HPLC stream. When the period of time the target component is detected ends, the stream select valve is switched such that another HPLC stream and the detector are connected and the detection of the target component is sequentially performed. That is, by connecting the detection window times of a plurality of set target components to each other, the processing time or processing speed of the entire apparatus is improved.

CITATION LIST

Patent Literature

PTL 1: WO-A-2017/122261

Non-Patent Literature

Agilent Technologies Inc., "The Agilent StreamSelect LC/MS Solution: Increasing the Throughput of a Triple Quadrupole Mass Spectrometer", URL:https://www.agilent.com/cs/library/technicaloverviews/public/5991-3274EN.pdf

SUMMARY OF INVENTION

Technical Problem

As described above, when the target component is determined, the analysis conditions stored in the control device are loaded to start analysis. The HPLC streams have the same configuration and are arranged in parallel. Therefore, unless degradation of apparatus components including the separation column occurs, the estimated time where a peak appears does not change.

In the analysis apparatus in which a plurality of HPLC streams are connected to one detector through a column selector valve, in order to prevent the peak appearance time from changing even when the same target component is analyzed in a plurality of different HPLC streams, the capacities of pipe flow paths that connect the liquid delivery pump, the injector, and the separation column to each other need to be the same. In this case, the capacities including the lengths of the pipes and the dead volumes of connection portions need to be the same.

In the apparatus configuration where the HPLC streams are arranged in parallel and are connected to one detector, in order to make the pipe lengths of the HPLC streams the same, the pipe are lengthened as the number of HPLC streams increases. The reason for this is that the pipe length of a pipe that connects each of the streams to the stream select valve increases.

However, the inner diameter of a pipe has a tolerance even when the accuracy thereof is controlled. In the case of a pipe that is quality-controlled, for example, a pipe having an inner diameter of 0.1 mm, if the tolerance is 0.01 mm and the length is 1000 mm, a capacity error of about 3.14 µL occurs.

When the flow rate of the liquid delivery pump is set to, for example, 100 µL/min, there may be a difference of about 2 seconds between the peak appearance times even under the same analysis conditions. That is, depending on the detection window time, there may be a case where the detection timing deviates from the detection window time due to the difference of 2 seconds such that the target component cannot be detected.

In general HPLC, the number of streams is one, and the HPLC stream is connected to the detector constantly. Therefore, the deviation in peak appearance time is not likely to cause problems. In addition, by reducing the pipe length, the deviation in peak appearance time caused by the capacity including the tolerance of the pipe inner diameter and the dead volume of the connection portion can be reduced.

In the apparatus in which a plurality of HPLC streams are coupled to one detector through a stream select valve that switches between the HPLC streams and analysis is performed while changing the detection window times, it is difficult to reduce the pipe length because the plurality of HPLC streams are arranged in parallel.

In addition, a variation in peak appearance time between HPLC streams is affected by degradation of the separation column, clogging of the pipe, leakage from a gap between the flow path pipe and the connection portion, liquid-delivery failure of the pump, and the like. However, in order to specify the reason for the variation in peak appearance time, time and effort are required, for example, to detach the pipe from the upstream side of the analysis apparatus to check a variation in pressure, clogging, or leakage.

An object of the present invention is to implement an analysis apparatus capable of adjusting holding time of each stream in a plurality of HPLC streams without adjusting a pipe length, and capable of determining degradation of a separation column, a liquid-delivery failure, or the like without removing a pipe from the apparatus.

Solution to Problem

In order to achieve the objects, the invention is configured as follows.

An analysis apparatus includes: a plurality of streams each including a separation column that separates a sample, and a pump that liquid-delivers a sample or a solvent to the separation column; a detector that detects a sample separated by the separation column of the plurality of streams; and a control unit that controls operation of the plurality of streams and the detector, in which each of the plurality of streams includes a verification flow path connected in parallel to the separation column, and the control unit supplies a verification sample to the verification flow path of the plurality of streams, and corrects set values of the plurality of streams based on holding time of the verification sample introduced from the verification flow paths into the detector.

Advantageous Effects of Invention

An analysis apparatus capable of adjusting holding time of each stream in a plurality of HPLC streams without adjusting a pipe length, and capable of determining degradation of a separation column, a liquid-delivery failure, or the like without removing a pipe from the apparatus can be implemented.

BRIEF DESCRIPTION OF DRAWINGS

FIG. 1 is an overall configuration diagram of an analysis apparatus to which an embodiment of the invention is applied.

FIG. 2 is an operation explanatory diagram of a shipper distribution valve.

FIG. 3 is an operation explanatory diagram of an injection valve.

FIG. 4 is an operation explanatory diagram of a syringe distribution valve.

FIG. 5 is an operation explanatory diagram of a column selector valve (IN).

FIG. 6 is an operation explanatory diagram of a column selector valve (OUT).

FIG. 7 is an operation explanatory diagram of a stream select valve.

FIG. 8 is an explanatory diagram of a three-way solenoid valve.

FIG. 9 is a time chart when a target component is measured by using a stream (1) and a stream (2) in parallel.

FIG. 10 is a diagram showing an analysis apparatus in which a dummy column is arranged in a verification flow path.

FIG. 11 is a flowchart of a method of correcting a deviation between holding time of the stream (1) and holding time of the stream (2).

FIG. 12 is a diagram that compares holding time of chromatogram of the stream (1) and holding time of chromatogram of the stream (2).

FIG. 13 is a flowchart of a method of correcting a column flow path in a stream.

FIG. 14 is a flowchart of soundness evaluation of an apparatus.

DESCRIPTION OF EMBODIMENTS

Hereinafter, an embodiment of the present invention will be described with reference to the accompanying drawings.

A main target of the embodiment described below is high performance liquid chromatography (HPLC), but the present invention is applicable to general analysis apparatuses.

The present invention is also applicable to, for example, gas chromatography, ultra high performance liquid chromatography, or a clinical testing machine including HPLC/MS and a column separation unit. A general HPLC includes a liquid delivery pump, an injector, a column, a column oven that controls the temperature of the column, and a pipe that connects the liquid delivery pump, the injector, and the separation column to each other.

An overall configuration of the apparatus according to the present invention is a multi-HPLC apparatus in which a plurality of HPLC flow paths are coupled to one detector through a stream select valve that switches between the HPLC flow paths such that analysis of the HPLC streams can be performed.

Embodiment

Hereinafter, the embodiment of the present invention will be described.

FIG. 1 is an overall configuration diagram of an analysis apparatus to which an embodiment of the invention is applied.

In FIG. 1, the analysis apparatus includes a pump (stream 1) 103, a pump (stream 2) 104, an injection valve (stream 1) 105, an injection valve (stream 2) 106, a sample loop (stream 1) 107, a sample loop (stream 2) 108, and a shipper 109.

In addition, the analysis apparatus includes a shipper distribution valve 110, vials 111, a syringe distribution valve 112, a washing pump 113, a syringe 114, a three-way solenoid valve 115, a column selector valve (IN, stream 1) 116, a column selector valve (IN, stream 2) 117, a column selector valve 118 (OUT, stream 1), and a column selector valve (OUT, stream 2) 119.

Further, the analysis apparatus includes a separation column (stream 1) 120 that separates a sample, a separation column (stream 2) 121 that separates a sample, a verification flow path (stream 1) 122, a verification flow path (stream 2) 123, a stream select valve 124, a detector 125 that detects the samples separated by the separation columns 120 and 121, a column oven (stream 1) 126, a column oven (stream 2) 127, a pressure sensor (stream 1) 128 that measures a liquid-delivery pressure of the pump 103, a pressure sensor (stream 2) 129 that measures a liquid-delivery pressure of the pump 104, and a control unit 130.

The valves 105, 106, 110, 112, 116, 117, 118, 119, and 124 are valves that change flow paths in the streams 101 and 102.

In addition, components of each of the streams 101 and 102 are connected through a pipe that forms the flow path.

Hereinafter, the separation column will also be abbreviated as "column". In addition, the separation column will also be referred to as "analysis column".

The apparatus is composed of two streams including the stream (1) 101 and the stream (2) 102.

The apparatus configuration of the stream (1) 101 will be described. In the stream (2) 102, the shipper 109, the shipper distribution valve 110, the syringe distribution valve 112, the column selector valve 124, the syringe 114, the three-way solenoid valve 115, and the washing pump 113 are shared with the stream (1) 101 and have the same configuration as the stream (1) 101. Therefore, the detailed description will not be repeated.

In the present embodiment, 30 vials 111 are held in a turntable (not shown). The turntable rotates up to a moving range of the shipper 109, and the shipper 109 moves in a rotation direction (θ) and an up-down direction (Z) to suction the sample. In the present embodiment, a material of the shipper 109 has an inner diameter φ of 0.5 mm and a length of 50 mm. The vials 111 do not need to be held in the turntable. For example, a sample rack that can hold 10 vials 111 in the X direction and 12 vials 111 in the Y direction, that is, 120 vials 111 in total may be used. In this case, the shipper 109 moves in the X, Y, and Z directions to suction the sample. The shipper 109 is connected to the shipper distribution valve 110 through a SUS pipe having an inner diameter φ of 0.5 mm and a length of 50 mm.

The shipper distribution valve 110 will be described using FIG. 2.

FIG. 2 is an operation explanatory diagram of the shipper distribution valve 110. In FIG. 2, the shipper distribution valve 110 is a three-way two-position valve, and the shipper 109 is connected to a port 1. A port 2 of the shipper distribution valve 110 is connected to the injection valve (stream 1) 105 through a SUS pipe having an inner diameter φ of 0.1 mm and a length of 20 mm.

A port 3 of the shipper distribution valve 110 is connected to the injection valve (stream 2) 106 through a SUS pipe having an inner diameter ϕ of 0.1 mm and a length of 20 mm. At a position 1, the port 1 and the port 2 are connected such that a flow path including the syringe 109, the shipper distribution valve 110, and the injection valve (stream 1) 105 is formed. At a position 2, the port 1 and the port 3 are connected such that a flow path including the syringe 109, the shipper distribution valve 110, and the injection valve (stream 2) 106 is formed.

The injection valve (stream 1) 105 will be described using FIG. 3. FIG. 3 is an operation explanatory diagram of the injection valve (stream 1) 105. In FIG. 3, the injection valve (stream 1) 105 is a six-port two-position valve, the pump (stream 1) 103 is connected to the port 1, and the pressure sensor (stream 1) 128 is arranged between the pump (stream 1) 103 and the injection valve (stream 1) 105 (not shown in FIG. 3).

A port 6 of the injection valve (stream 1) 105 is connected to the column selector valve (IN, stream 1) 116 through a SUS pipe having an inner diameter ϕ of 0.1 mm and a length of 1000 mm. The 10 µL sample loop (stream 1) 107 (inner diameter ϕ: 0.4 mm, length: 79.6 mm, SUS) is connected to the port 2 and a port 5. The shipper distribution valve 110 is connected to the port 3 through a SUS pipe having an inner diameter ϕ of 0.5 mm and a length of 200 mm. The syringe distribution valve 112 is connected to a port 4 through a SUS pipe having an inner diameter ϕ of 0.5 mm and a length of 500 mm.

At the position 1, the port 1 and the port 6 are connected, the port 2 and the port 3 are connected, and the port 4 and the port 5 are connected such that a flow path including the shipper distribution valve 110, the sample loop 107, and the syringe distribution valve 112 is formed.

At the position 2, the port 1 and the port 2 are connected, the port 3 and the port 4 are connected, and the port 5 and the port 6 are connected such that a flow path including the pump 103, the sample loop 107, and the syringe distribution valve 112 is formed.

The syringe distribution valve 112 will be described using FIG. 4. FIG. 4 is an operation explanatory diagram of the syringe distribution valve 112. In FIG. 4, the syringe distribution valve 112 is a four-port two-position valve, and the injection valve (stream 1) 105 is connected to the port 1 through a SUS pipe having an inner diameter ϕ of 0.5 mm and a length of 500 mm. The port 2 is connected to a drainpipe (not shown). The port 3 is connected to the injection valve (stream 2) 106 through a SUS pipe having an inner diameter ϕ of 0.5 mm and a length of 500 mm. The syringe 114 is connected to the port 4 through a PTFE pipe having an inner diameter ϕ of 0.8 mm and a length of 600 mm.

At the position 1, the port 1 and the port 4 are connected and the port 2 and the port 3 are connected such that a flow path including the injection valve (stream 1) 105, the syringe distribution valve 112, and the syringe 114 is formed. At the position 2, the port 1 and the port 2 are connected and the port 3 and the port 4 are connected such that a flow path including the injection valve (stream 2) 106, the syringe distribution valve 112, and the syringe 114 is formed.

The three-way solenoid valve 115 (FIG. 8) is arranged between the syringe distribution valve 112 and the syringe 114, and in a normal condition (normally open side) of the three-way solenoid valve 115, the syringe distribution valve 112 and the syringe 114 are connected. When the three-way solenoid valve 115 is switched (normally closed side), the syringe distribution valve 112 and the washing pump 113 are connected.

The column selector valve (IN) 116 and the column selector valve (OUT) 118 will be described using FIGS. 5 and 6. FIGS. 5 and 6 are operation explanatory diagrams of the column selector valves.

The column selector valve (IN) 116 and the column selector valve (OUT) 118 are four-port three-position valves and have the same shape.

The injection valve (stream 1) 105 is connected to the port 1 of the column selector valve (IN) 116 through a SUS pipe having an inner diameter ϕ of 0.1 mm and a length of 2250 mm. The ports 3 of the column selector valve (IN) 116 and the column selector valve (OUT) 118 are connected to the column (stream 1) 120 through a SUS pipe having an inner diameter ϕ of 0.1 mm and a length of 500 mm.

As in the port 3, the column (stream 1) 120 is connected to the port 4 through a SUS pipe having an inner diameter ϕ of 0.1 mm and a length of 500 mm.

The column (stream 1) 120 has a shape having an inner diameter ϕ of 0.5 mm and a length of 500 mm, and the separation mode is a reversed-phase (ODS). In addition to the reversed-phase (ODS), the separation mode of the column (stream 1) 120 may be a normal phase, HILIC, ion exchange, GPC, or affinity.

At the position 1 of the column selector valves 116 and 118, the port 1 and the port 4 are connected such that a flow path including the injection valve (stream 1) 105, the column selector valve (IN) 116, the column (stream 1) 120, and the column selector valve (OUT) 118 is formed.

At the position 2, the port 1 and the port 3 are connected such that a flow path including the injection valve (stream 1) 105, the column selector valve (IN) 116, the column (stream 1) 120, and the column selector valve (OUT) 118 is formed.

At the position 3, the port 1 and the port 2 are connected such that a flow path including the injection valve (stream 1) 105, the column selector valve (IN) 116, the verification flow path (stream 1) 122, and the column selector valve (OUT) 118 is formed.

At the positions 1, 2, and 3, the capacities of the flow paths between the column selector valve (IN) 116 and the column selector valve (OUT) 118 are the same. The column (stream 1) 120 and the verification flow path (stream 1) 122 are arranged in the column oven (stream 1) 126, and the temperature thereof is controlled. The temperature control may be performed in the entire inside of the column oven (stream 1) 126, and a heat source may be brought into contact with each of the columns to perform the temperature control.

The stream select valve 124 will be described using FIG. 7.

FIG. 7 is an operation explanatory diagram of the stream select valve 124.

In FIG. 7, the stream select valve 124 is a four-port two-position valve, and the column selector valve (OUT, stream 1) 118 is connected to the port 1 through a SUS pipe having an inner diameter ϕ of 0.5 mm and a length of 500 mm. The port 2 is connected to a drainpipe. The port 3 is connected to the column selector valve (OUT, stream 2) 119 through a SUS pipe having an inner diameter ϕ of 0.5 mm and a length of 500 mm. The port 4 is connected to the detector 125 through a SUS pipe having an inner diameter ϕ of 0.5 mm and a length of 500 mm.

At the position 1, the port 1 and the port 4 are connected and the port 2 and the port 3 are connected such that a flow path including the column selector valve (OUT, stream 1) 118, the stream select valve 124, and the detector 125 is formed.

At the position 2, the port 1 and the port 2 are connected and the port 3 and the port 4 are connected such that a flow path including the column selector valve (OUT, stream 2) 119, the stream select valve 124, and the detector 125 is formed.

In the present embodiment, as the detector 125, a diode array (DAD) detector is used. In this case, the detector does not need to be DAD and may be a UV detector or a mass spectrometer.

Measurement steps of the stream (1) 101 will be described.

The measurement steps of the stream (1) 101 include 1) measurement of the sample in the sample loop, 2) introduction of the sample into the column, 3) column separation, and 4) washing.

In 1) the measurement of the sample in the sample loop, the position of the shipper distribution valve 110 is the position 1, the position of the injection valve (stream 1) 105 is the position 1, the position of the syringe distribution valve 112 is the position 1, and the three-way solenoid valve 115 is positioned on the normally open side.

In this state, the syringe 114 performs the suction operation, and the samples are introduced from the vials 111 into the sample loop (stream 1) 107. In order to reduce the amount of the sample to be used, the sample may be introduced into the sample loop 107 through an air layer.

In 2) the introduction of the sample into the column, the position of the injection valve (stream 1) 105 is switched to the position 2, the pump 103, the injection valve (stream 1) 105, and the column selector valve (IN, stream 1) 116 are connected, and the sample is introduced into the column (stream 1) 120.

In 3) the column separation, the column selector valve (IN, stream 1) 116 and the column selector valve (OUT, stream 1) 118 are switched to the positions of the flow path of the column to be used, the solvent composition of the pump 103 is changed, and the gradient liquid delivery is performed to perform the column separation of the sample.

4) The washing step is performed parallel to 3) the column separation. In a state where the position of the shipper distribution valve 110 is the position 1, the position of the injection valve (stream 1) 105 is the position 1, the position of the syringe distribution valve 112 is the position 1, and the three-way solenoid valve 115 is positioned on the normally closed side, a washing solution is delivered from the washing pump 113 to wash the injection valve (stream 1) 105 and the shipper 109. During washing, the shipper 109 is moved to a waste solution tank (not shown), and the washing solution flows to the waste solution tank (not shown).

FIG. 9 is a time chart when a target component is measured by using the stream (1) 101 and the stream (2) 102 in parallel.

In FIG. 9, steps of sample measurement 901, sample introduction 902, column separation (detection window) 903, and washing 904 are sequentially performed. These steps 901 to 904 are performed in parallel such that the steps of detection window 903 do not overlap each other at the same time.

That is, at the same time when the stream (1) 101 starts the sample introduction 902 after performing the sample measurement 901, the stream (2) 102 starts the sample measurement 901.

The stream (1) 101 starts the column separation 903, the washing 904, and the sample introduction 901 after performing the sample introduction 902, and concurrently the stream (2) 102 starts the sample introduction 902.

Next, the stream (2) 102 starts the column separation 903, the washing 904, and the sample introduction 901, and concurrently the stream (1) 101 starts the sample introduction 902.

Hereinafter, in the same manner, these steps 901 to 904 are performed in parallel such that the steps of detection window 903 do not overlap each other at the same time.

When the target component is measured in advance, holding time is stored in the control unit 130, and at a peak detection time of the target component of the stream (1) 101 in a time zone including the holding time, the stream select valve 124 is switched to the position 1, and the separated sample is introduced into the detector 124.

Likewise, at the peak detection time of the target component of the stream (2) 102, the stream select valve 124 is switched to the position 2, and the separated sample is introduced into the detector 124.

In the example shown in FIG. 1, the verification flow paths 122 and 123 are configured with only flow paths. However, a dummy column may be arranged in the verification flow paths 122 and 123.

FIG. 10 is a diagram showing an analysis apparatus in which a dummy column 120D is arranged in the verification flow path 122 and a dummy column 121D is arranged in the verification flow path 123.

A method of operating the verification flow paths 122 and 123 will be described with reference to FIG. 10. The dummy columns 120D and 121D arranged in the verification flow paths 122 and 123 are columns having the same shape as the columns 120 and 121 with an inner diameter φ of 0.5 mm and a length of 500 mm.

The dummy columns 120D and 121D are filled with filler particles with surfaces to which a functional group does not bind. The column selector valve (IN) 116 and the column selector valve (OUT) 118 are connected before and after the dummy column 120D through a SUS pipe having an inner diameter φ of 0.1 mm and a length of 500 mm. In addition, the column selector valve (IN) 117 and the column selector valve (OUT) 119 are connected before and after the dummy column 121D through a SUS pipe having an inner diameter φ of 0.1 mm and a length of 500 mm. Pressure loss of each of the verification flow paths 122 and 123 is substantially the same as pressure loss of each of the dummy columns 120D and 121D.

The flow paths of the columns 120 and 121 and the verification flow paths 122 and 123 are configured to have the same capacity and the same pressure loss. The verification flow paths 122 and 123 shown in FIG. 1 are pipes having an inner diameter φ of 0.5 mm and a length of 500 mm that are not filled with filler particles. In this case, although the verification flow paths 122 and 123 have the same capacity as the flow path of the columns 120 and 121, the pressure loss thereof is not the same as the flow path where the columns 120 and 121 are arranged.

A method of correcting a deviation between holding time of the stream (1) 101 and holding time of the stream (2) 102 will be described using the flowchart of FIG. 11. The deviation is corrected by the control unit 130.

In Step S1 of FIG. 11, before starting the operation of the apparatus, the column selector valve (IN) 116 and the column selector valve (OUT) 118 are switched to be connected to the verification flow path 122, and air is suctioned from the shipper 109 and is injected (supplied) into the verification flow path 122. In a case where the detector 125 is, for example, a mass spectrometer, when air is introduced into the detector 125, a baseline varies. Holding time information during the variation of the baseline is stored in the control unit 130.

Next, the same operation is also performed in the stream (2) 102, and the holding time information is stored in the control unit 130. For example, a verification sample such as caffeine may be used instead of air. In this case, the verification sample is measured under measurement conditions of a verification sample.

Even in the case of the verification sample, the holding time information is stored in the control unit 130.

Next, in Step S2, air or the verification sample of the verification flow paths 122 and 123 of the stream (1) 101 and the stream (2) 102 is measured. In Step S3, the holding time of the stream (1) 101 and the holding time of the stream (2) 102 are compared to determine whether or not there is a difference of 1 second or more in the holding time.

In Step S4, when there is a difference of less than 1 second in the holding time, the process proceeds to Step S5, and the measurement continues without correction.

In Step S4, when there is a difference of 1 second or more in the holding time, the process proceeds to Step S6, and the correction is performed. In addition, in Step S4, regarding the same verification flow paths 122 and 123 of the stream (1) 101 and the stream (2) 102, the holding time is compared to the holding time information stored in advance in the control unit 130 in Step S1, and when the difference in holding time is 1 second or more, the process proceeds to Step 6, and the correction is performed.

The correction in Step S6 will be described, for example, using a chromatogram shown in FIG. 12.

When the holding time of a chromatogram 1101 of the stream (1) 101 and the holding time of a chromatogram 1102 of the stream (2) 102 are compared in FIG. 12, the holding time of the stream (2) 102 is earlier by 1.55 sec (85.61 to 84.01 sec). The deviation in holding time is caused by the tolerance of the pipe capacity or the dead volume of the connection portion between the stream (1) 101 and the stream (2) 102.

In order to change the flow rate for correction, when the flow rate of the stream to be corrected is represented by Q', the volume is represented by V, the flow rate of the stream is represented by Q1, the holding time of the stream is represented by t1, and the holding time of the stream to be corrected is represented by t2, the control unit 130 calculates the corrected flow rate Q' from the following Expression (1).

$$Q' = \{V + Q1(\mu L/sec) \times (t2 - t1)\}/V \times Q1(\mu L/sec) \quad (1)$$

In the present embodiment, where the holding time of the stream (1) 101 is 85.61 sec, the holding time of the stream (2) 102 is 84.01 sec, the inner volume (V) of the stream is 15.7 µL, the flow rate Q is 111 µL/min (1.85 µL/sec), and the difference (t) in holding time is 1.5 sec, when these values are substituted into Expression (1), the corrected flow rate is calculated as 91.4 µL/min (1.52 µL/sec).

The flow rate of the stream (2) to be corrected is corrected to 91.4 µL/min, and the measurement is performed. As a result, the holding time of the stream (2) is corrected to about 85.4 sec (corrected chromatogram 1103 in FIG. 12).

This way by comparing the holding time measured in the verification flow paths 122 and 123 and the holding time stored in advance in the control unit 130, calculating a new flow rate, and applying the calculated new flow rate, the deviation in holding time can be corrected.

A threshold for the variation of the holding time is set to 1 second. However, the threshold does not need to be 1 second and is a value that can be set by a user.

The above-described correction is applicable not only to the correction between the streams (1) and (2) but also to the correction in the stream (1) or the stream (2).

FIG. 13 is a flowchart of a method of correcting the column flow path in the stream.

In Step S10 of FIG. 13, the holding time information (air or the verification sample) of each of the column flow paths in the same stream (in this description, a column flow path (column 1 flow path) of one of the columns 120 and 121 and a column flow path (column 2 flow path) another one of the columns 120 and 121 and the holding time information of the verification flow path 122 or 123 are stored in the control unit 130. In Step S11A, the verification sample is supplied to the column 1 flow path, and the holding time is measured. In addition, in Step S11B, the verification sample is supplied to the column 2 flow path, and the holding time is measured. It is desirable to perform the measurement in a maintenance (TM) mode. However, the measurement may be performed during an operation (start-up or shut-down of the apparatus).

In Step S12A, the holding time information of the column 1 flow path is compared to the holding time information stored in advance in the control unit 130, and whether or not the difference in holding time is 1 second or more is determined in Step S13. When the difference in holding time is 1 second or more, the holding time is corrected using Expression (1) in Step S15.

Likewise, in Step S12B, the holding time information of the column 2 flow path is compared to the holding time information stored in advance in the control unit 130, and whether or not the difference in holding time is 1 second or more is determined in Step S13. When the difference in holding time is 1 second or more, the holding time is corrected using Expression (1) in Step S15.

In Step S13, when the difference in holding time is less than 1 second, the process proceeds to Step S14A in the case of the column 1 flow path and proceeds to Step S14B in the case of the column 2 flow path, and the measurement continues without correction.

Regarding the verification flow paths 122 and 123, the holding time is measured using the verification sample as in the column 1 flow path and the column 2 flow path, the measured holding time is compared to the holding time information stored in advance in the control unit 130, and when the difference therebetween is 1 second or more, the holding time is corrected using Expression (1).

The column flow path can be corrected by changing the gradient slope (ratio between a solvent A and a solvent B) in addition to the correction of the flow rate.

In the present embodiment, a reversed-phase (ODS) column is mounted as the column, an aqueous solvent is used as the solvent A, and an organic solvent is used as the solvent B. Therefore, when the holding time becomes earlier, the concentration gradient of the solvent B increases. On the other hand, when the holding time becomes later, the concentration gradient of the solvent B decreases.

A correlation between the holding time and the concentration gradient is stored in advance in the control unit 130, and gradient information is loaded from the holding time information and is corrected.

In HPLC of the related art, a known example of adjusting an injection timing to correct the holding time is also disclosed. However, in the present apparatus in which HPLC's are arranged in parallel and a peak of a measurement target material is detected during a predetermined detection window by switching a stream select valve, when an injection timing is changed, the separation column equilibration step, the elution step, the washing step, and the injector washing step may deviate. Therefore, it is not realistic to adjusting the injection timing.

When the holding time is delayed, the holding time can also be corrected by increasing the equilibration time in an initial solvent and delaying the start timing of the gradient.

Not only the correction of the holding time but also soundness check in the apparatus can be performed by using the verification flow paths 122 and 123.

The soundness check in the apparatus will be specifically described. FIG. 14 is a flowchart of soundness evaluation of the apparatus. This soundness evaluation is performed by the control unit 130.

In Step S20 of FIG. 14, the holding time and pressure information are measured using the verification sample such as caffeine as the column flow path (column 1 flow path, column 2 flow path) and the verification flow paths. The holding time and the pressure information that are measured are stored in the control unit 130. The pressure information is information detected by the pressure sensors 128 and 129.

Next, in Step S21, each of the column flow paths (column 1 flow path and column 2 flow path) and the verification flow paths is set to the maintenance mode (TM), and the holding time information and the pressure information thereof are measured and acquired using the verification sample such as caffeine.

In Step S22, the acquired holding time information and the acquired pressure information are compared to the holding time information and the pressure information stored in advance in the control unit 130.

In Step S23, whether or not there is a change (±5 sec) between the holding time of the column flow path and the holding time of the verification flow path is determined. When there is no change, it is determined that there is no problem in the soundness of the apparatus, the measurement continues, and the process proceeds to Step S25.

In Step S23, when the change between the holding time of the column flow path and the holding time of the verification flow path is a given value (±5 sec) or more, the process proceeds to Step S24, leakage or clogging of another flow path or failure of the pump is checked. That is, it is determined that clogging or leakage of the pipe, the connection portion, and the valve occurs such that the pipe, the connection portion, and the valve are not sound, and these components are checked.

In Step S25, when the holding time of the column flow path varies by a given value (±5 sec) or more, the processor proceeds to Step S26, and the acquired pressure information of the column flow path and the stored pressure information are compared. In Step S27, when the pressure of the column flow path changes by a given value (±5 MPa) or more, the processor proceeds to Step S29, and conversion of the column is performed.

In Step S27, when the pressure of the column flow path does not vary by the given value (±5 MPa) or more, the processor proceeds to Step S28, and the holding time of the column flow path is corrected using Expression (1).

In Step S25, when the holding time of the column flow path does not vary by a given value (±5 sec) or more, in Step S30, whether or not the holding time of the verification flow path varies by a given value (±5 sec) or more is determined. In Step S30, when the holding time of the verification flow path varies by a given value (±5 sec) or more, the process proceeds to Step S31, and the acquired pressure information of the verification flow path is compared to the stored pressure information. In Step S32, when the pressure of the verification flow path does not vary by the given value (±5 MPa) or more, the processor proceeds to Step S33, and the holding time of the verification flow path is corrected using Expression (1).

In Step S32, when the pressure of the verification flow path varies by the given value (±5 MPa) or more, the process proceeds to Step S34, and conversion of the verification flow path is performed.

In Step S30, when the holding time of the verification flow path does not vary by a given value (±5 sec) or more, in Step S35, it is determined that there is no problem in the soundness evaluation.

In the example shown in FIG. 14, the soundness of each of the streams 101 and 102 is evaluated using the two pieces of information including the holding time information and the pressure information. However, the soundness can also be evaluated using only one of the holding time information and the pressure information.

The embodiment of the present invention is configured as described above. An analysis apparatus capable of adjusting holding time of each stream in a plurality of HPLC streams 101 and 102 without adjusting a pipe length, and capable of determining degradation of the separation columns 120 and 121, a liquid-delivery failure, or the like without removing a pipe from the apparatus can be implemented.

In addition, by providing the verification flow paths 122 and 123 in the HPLC streams 101 and 102 in addition to the separation columns 120 and 121, the following two effects are obtained.

First, by grasping and correcting the inner capacity of the analysis apparatus between the HPLC streams 101 and 102 using the verification flow paths 122 and 123, a variation in peak appearance time between the HPLC streams 101 and 102 can be reduced.

Second, by comparing the information of the verification flow paths 122 and 123 and the information of the separation column flow paths, whether the variation in peak appearance time is affected by the separation columns 120 and 121 or the pipe flow paths can be determined.

Regarding the first effect, by analyzing the peak appearance time of air or the verification sample in the verification flow paths 122 and 123 that do not pass through the separation columns 120 and 121 of the streams 101 and 102, the inner capacity of the analysis apparatus between HPLC streams 101 and 102 can be verified.

The deviation in holding time caused by the difference in capacity between the HPLC streams 101 and 102 can be adjusted using the above-described two methods. In the former method, the flow rates of the liquid delivery pumps 103 and 104 are adjusted based on the inner volume of the analysis apparatus between the HPLC streams 101 and 102 such that the peak appearance times of the HPLC streams 101 and 102 match each other. As a result, a variation in peak appearance time between the HPLC streams 101 and 102 can be reduced. Therefore, the detection timing can be prevented from deviating from the detection window time, and the non-detection of the target component can be prevented.

In the latter method, by maintaining the flow rates of the liquid delivery pumps 103 and 104 and adjusting the gradient slope such that the peak appearance times of the HPLC streams 101 and 102 match each other, a variation in peak appearance time can also be reduced.

Regarding the second effect, when the peak appearance time varies during analysis, the peak holding time of the verification sample of the analysis apparatus is analyzed and is compared to the previous result in the verification flow paths 122 and 123 that do not pass through the separation columns 120 and 121. As a result, whether the variation in peak appearance time is affected by the separation columns 120 and 121 or the pipe flow paths can be determined.

When the variation in peak appearance time is affected by the separation columns 120 and 121, conversion of the separation columns 120 and 121 is performed.

When the variation in peak appearance time is affected by the pipe flow paths, the pressure values of the liquid delivery pumps 103 and 104 are checked and are compared to the previous result. When the pressure is high, it is determined that the variation in peak appearance time is affected by the clogging of the pipe flow paths, the connection portion, or the valve. When the pressure value is low, it is determined that the variation in peak appearance time is affected by leakage from the pipe flow paths or the connection portion.

The above-described embodiment shows the configuration of the two streams. However, the number of streams only needs to be two or more. Depending on the number of streams, the inner shape of the stream selector valve to be mounted or the number of ports thereof vary.

In addition, in the present embodiment, two columns are mounted for each stream. However, the number of columns only needs to be two or more. Depending on the number of columns, the inner shape of each of the column selector valve (IN, stream 1) 116 and the column selector valve (OUT, stream 1) 118 to be mounted or the number of ports thereof vary.

In addition, in the present embodiment, the injector is a sample loop type. However, the injector does not need to be a sample loop type and may be a partial injection type or a direct injection type. In the partial injection type, a predetermined amount of a sample is measured by syringe suction using a shipper, and the shipper is moved up to an injection valve including an injection port and a sample loop. The shipper is inserted into the injection port, and the sample is introduced into the sample loop by syringe delivery. In the direct injection type, an injection port is provided in a flow path, and a predetermined amount of a sample is measured by syringe suction using a shipper. The shipper is inserted into the injection port, and the sample is introduced into the flow path by syringe delivery.

In the present invention, the verification sample can be defined as a term including air and caffeine.

In addition, in the present invention, by correcting the liquid-delivery flow rate of the pump of the stream or the gradient slope based on the difference in holding time between the streams 101 and 102, the difference in holding time can be controlled to be less than a predetermined difference (1 sec). Therefore, the liquid-delivery flow rate of the pump and the gradient slope to be corrected will be collectively referred to as the set values of the streams.

REFERENCE SIGNS LIST

101 stream (1)
102 stream (2)
103 pump (stream 1)
104 pump (stream 2)
105 injection valve (stream 1)
106 injection valve (stream 2)
107 sample loop (stream 1)
108 sample loop (stream 2)
109 shipper
110 shipper distribution valve
111 vial
112 syringe distribution valve
113 washing pump
114 syringe
115 three-way solenoid valve
116 column selector valve (IN, stream 1)
117 column selector valve (IN, stream 2)
118 column selector valve (OUT, stream 1)
119 column selector valve (OUT, stream 2)
120 column (stream 1)
121 column (stream 2)
120D, 121D dummy column
122 verification flow path (stream 1)
123 verification flow path (stream 2)
124 stream select valve
125 detector
126 column oven (stream 1)
127 column oven (stream 2)
128 pressure sensor (stream 1)
129 pressure sensor (stream 2)
130 control unit
901 sample measurement
902 sample introduction
903 column separation (detection window of detector)
904 washing
1101 chromatogram of stream 1
1102 chromatogram of stream 2
1103 corrected chromatogram

The invention claimed is:

1. An analysis apparatus comprising:
   a plurality of streams each including
      a separation column that separates a sample, and
      a pump that liquid-delivers a sample or a solvent to the separation column;
   a detector that detects a sample separated by the separation columns of the plurality of streams; and
   a control unit that controls operation of the plurality of streams and the detector, wherein
   each of the plurality of streams includes a verification flow path (i) connected in parallel to the separation column and (ii) including a dummy column filled with a filler that does not bind a functional group, and
   the control unit supplies a verification sample to the verification flow path in each of the plurality of streams, and corrects set values of the plurality of streams based on holding times of the verification samples introduced from the verification flow paths into the detector, the set values of the streams being at least one of a liquid-delivery flow rate and a gradient grade of the pumps.

2. The analysis apparatus according to claim 1, wherein in each of the plurality of streams
   a pressure loss of the verification flow path and a pressure loss of the dummy column are substantially the same.

3. The analysis apparatus according to claim 1, wherein the control unit corrects the set values in each of the plurality of streams based on a difference between holding time of the verification sample stored in advance in the control unit and the holding time of the verification sample introduced into the detector.

4. The analysis apparatus according to claim 1, wherein the control unit performs soundness evaluation of the plurality of streams based on information stored in advance in the control unit.

5. The analysis apparatus according to claim 4, wherein the information stored in advance in the control unit is holding times of the separation columns of the verification samples and holding times of the verification flow paths, and the soundness evaluation of the plurality of streams is performed based on a difference between holding times of the verification samples introduced into the detector and holding times stored in advance in the control unit.

6. The analysis apparatus according to claim 4, wherein
each of the plurality of streams includes a pressure sensor that measures liquid-delivery pressure of the pump,
the information stored in advance in the control unit is liquid-delivery pressure information of the pump in each of the plurality of streams, and the control unit supplies a verification sample to the separation column and the verification flow path of each of the plurality of streams, and performs soundness evaluation of the plurality of streams based on liquid-delivery pressure information of the pumps measured by the pressure sensors and the liquid-delivery pressure information of the pumps stored in advance in the control unit.

7. The analysis apparatus according to claim 4, wherein
each of the plurality of streams includes a pressure sensor that measures liquid-delivery pressure of the pump, a pipe that forms a flow path, and a valve that forms a flow path,
the information stored in advance in the control unit is holding time of the verification flow path of the verification sample and holding time of the separation column, and liquid-delivery pressure information of the pump, and
for each of the plurality of streams, the control unit performs soundness evaluation of the separation column, the verification flow path, the pipe, and the valve based on a difference between holding time of the verification sample supplied to the verification flow path and to the separation column and the holding time stored in advance in the control unit, and a difference between liquid-delivery pressure information of the pump measured by the pressure sensor and the liquid-delivery pressure information of the pump stored in advance in the control unit.

8. The analysis apparatus according to claim 7, wherein the control unit is configured to:
when a difference between the holding time of the separation column and the holding time stored in advance and a difference between the holding time of the verification flow path and the holding time stored in advance are both a certain value or more, determine that a pipe that forms a flow path of the stream and a valve that forms a flow path of the stream are not sound, when the difference between the holding time of the separation column and the holding time stored in advance of the difference between the holding time of the separation column and the holding time stored in advance and the difference between the holding time of the verification flow path and the holding time stored in advance is a certain value or more, correct the holding time of the separation column when the difference between the liquid-delivery pressure information of the pump measured by the pressure sensor and the liquid-delivery pressure information of the pump stored in advance in the control unit is less than a certain value, and determine conversion of the separation column when the difference between the liquid-delivery pressure information of the pump measured by the pressure sensor and the liquid-delivery pressure information of the pump stored in advance in the control unit is a certain value or more, and when the difference between the holding time of the verification flow path and the holding time stored in advance of the difference between the holding time of the separation column and the holding time stored in advance and the difference between the holding time of the verification flow path and the holding time stored in advance is a certain value or more, correct the holding time of the verification flow path when the difference between the liquid-delivery pressure information of the pump measured by the pressure sensor and the liquid-delivery pressure information of the pump stored in advance in the control unit is less than a certain value, and determine conversion of the verification flow path when the difference between the liquid-delivery pressure information of the pump measured by the pressure sensor and the liquid-delivery pressure information of the pump stored in advance in the control unit is a certain value or more.

* * * * *